(12) United States Patent
Phillips

(10) Patent No.: US 6,358,895 B1
(45) Date of Patent: *Mar. 19, 2002

(54) FLUID TREATMENT PROCESS

(75) Inventor: William David Phillips, Cheshire (GB)

(73) Assignee: PABU Services, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/952,764

(22) PCT Filed: May 4, 1994

(86) PCT No.: PCT/GB94/00954

§ 371 Date: Sep. 16, 1997

§ 102(e) Date: Sep. 16, 1997

(87) PCT Pub. No.: WO94/25550

PCT Pub. Date: Nov. 10, 1994

(51) Int. Cl.$^7$ ............................................. C10M 137/04
(52) U.S. Cl. ........................ 508/433; 75/710; 558/150
(58) Field of Search ........................ 508/433; 75/710; 558/150

(56) References Cited

U.S. PATENT DOCUMENTS

| | | | | |
|---|---|---|---|---|
| 3,331,662 A | * | 7/1967 | Feller | 23/123 |
| 3,351,669 A | * | 11/1967 | Anderson et al. | 558/150 |
| 3,708,508 A | * | 1/1973 | Schulz | 252/364 |
| 3,793,408 A | | 2/1974 | Schulz | 260/990 |
| 4,203,933 A | | 5/1980 | Mukai et al. | 260/990 |
| 4,205,023 A | * | 5/1980 | Anzerberger | 558/150 |
| 4,302,335 A | * | 11/1981 | Haberman | 210/651 |
| 4,402,883 A | | 9/1983 | Anzenberger, Sr. | 260/990 |
| 4,741,857 A | | 5/1988 | Horwitz et al. | 252/184 |
| 5,180,526 A | | 1/1993 | Holderness | 252/631 |

FOREIGN PATENT DOCUMENTS

| | | | |
|---|---|---|---|
| FR | 2278830 | * | 3/1976 |
| JP | 52068152 | * | 6/1977 |
| JP | 53069449 | * | 6/1978 |

OTHER PUBLICATIONS

F.C.J. Brandt, G. Braun and R. Trost, Der Maschinenschaden, 57(5), 194–195 (1984) and translation.*
R.L. Albright and P.A. Yarnell, "Ion–Exchange Polymers", Encyclopedia of Polymer Science and Engineering, vol. 8, Wiley–Interscience, New York, 1987, p376–377.*
Database WPI, Section Ch, Week 7813, Derwent Publications Ltd., London, GB; Class E11, AN 78–24069A & JP,A,53 015 594 (Nisshin Electrical KK) Feb. 13, 1978.
Patent Abstracts of Japan, vol. 016, No. 383 (C–0974) Aug. 17, 1992 & JP,A,04 122 792 (Hitachi Ltd) Apr. 23, 1992.

* cited by examiner

*Primary Examiner*—Jacqueline V. Howard

(57) ABSTRACT

Non-aqueous functional fluids are treated to avoid degradation or to recondition degraded fluids by a process which comprises contacting the fluid with an anionic ion-exchange resin and subsequently removing water by vacuum dehydration. The fluids can be restored and maintained at a water content of less than 0.1% w/w and an acid number of less than 0.2 mgKOH/gm. The fluid is preferably a triaryl phosphate based fluid. Treated fluids may exhibit improved properties especially increased resistivity.

29 Claims, No Drawings

FLUID TREATMENT PROCESS

This is a 371 of PCT/GB 94/00954 filed May 4, 1994.

This invention relates to novel conditioning processes useful in prolonging the effective life of functional fluids such as hydraulic fluids.

A variety of materials are utilised as non-aqueous hydraulic fluids and lubricants. The materials which are most commonly employed are triaryl phosphate esters, mineral oils and carboxylate esters. In use all of these materials degrade which degradation may manifest itself in the form of increased acidity of the fluid. As a result of this degradation the fluid must be replaced periodically. As this replacement is an expensive and time consuming operation a variety of reconditioning processes have been utilised in order to prolong the effective life of the fluid.

The various reconditioning processes which had been proposed for use with fluids comprising triaryl phosphates were reviewed by W D Phillips in Lubrication and Engineering Vol 39 (12), p766 to 780. A wide variety of solid materials including Fullers Earth, Attapulgus Clay, Activated Alumina, Diatomaceous Earth and Bentonite Clay have been used to filter the fluid. However, none of these processes proved to be ideal. There have also been proposals to utilise a macroporous anionic ion exchange resin as a filter preferably in combination with a cationic ion exchange resin. One disadvantage of using ion exchange resins to filter the fluid is that they are normally wet and their use introduces water into the fluid. This introduction of water is disadvantageous especially for fluids comprising esters such as triaryl phosphates, trialkyl phosphates, alkyl aryl phosphates and carboxylate esters as acids are produced by hydrolysis of the ester. There have been proposals to alleviate the increase in acidity resulting from hydrolysis of the fluid by incorporating a means for removing water from the fluid. The use of a vapour extractor acting on the main tank holding the fluid and a molecular sieve filter have been recommended although neither has proved ideal in use on a commercial scale.

The use of molecular sieves is less effective for ester based fluids as the acids produced by hydrolysis tend to remove metal ions from the sieve which in turn can increase the amount of particulate material deposited in the fluid and adversely effect the fluids surface active properties.

We have now discovered a novel reconditioning process for non aqueous functional fluids which utilises an anionic ion exchange resin in combination with a vacuum dehydration system. Surprisingly, such procedures are effective in prolonging the life of a fluid or in reconditioning a degraded fluid.

Accordingly, this invention provides a process for the treatment of a non-aqueous functional fluid which comprises contacting said fluid with an anionic ion exchange resin in the presence of sufficient water that the acidity of the fluid may be reduced and subsequently removing water from said fluid by vacuum dehydration.

The processes of this invention may be utilised not only to maintain the condition of a fluid but also to recondition a degraded fluid. The process may be operated on a batch or a continuous basis or any combination of these two approaches.

In a preferred embodiment a portion of the fluid used in a particular apparatus will be passed through a bypass, loop and the process will be applied to the fluid passing through the loop. The treated fluid will be combined with the main body of the fluid. The process may be operated continuously or intermittently in response to an analysis of the condition of the main body of the fluid.

The contact between the fluid and the anionic ion-exchange resin may conveniently be carried out by passing the fluid through a bed of the resin. Conveniently the resin can be packed into a cartridge which is inserted into a circuit through which the fluid can be pumped. In the preferred embodiment this circuit will be a bypass loop through which a minor portion of the fluid is passed.

Commercially available forms of the anionic ion exchange resins normally contain relatively large amounts of water. Some of this water is picked up by the fluid and removed in the dehydration step. These commercial resins may be and preferably are utilised in the processes of this invention. The water content of the resin may be reduced prior to use but this is not normally necessary. We have discovered that the resin bed remains functional in the processes of this invention for long periods without the need for its regeneration. During the operation of the process the resin may become ineffective with the result that the acidity of the fluid is not reduced to or maintained at the desired level. In this circumstance it may be necessary to employ a fresh resin bed.

The resin can be used either in the commercially available forms which are relatively wet or it can be predried so as to reduce its water content. The water content of a predried resin should not be reduced to a point at which it is rendered ineffective or degraded. In general we prefer to utilise resins which contain from 1 to 20 preferably from 3 to 15% w/w of water. The use of predried resins may be preferable since this minimises the initial increase in the water content of the fluid when it is contacted with the resin.

After contact with the resin the fluid will contain a quantity of water and this is reduced by a vacuum dehydration process. Such dehydration processes can readily be effected using commercially available equipment such as the HIVAC 124 Oil Purifier and the HSP 181 Series Oil Purifiers sold by Pall Industrial Hydraulics Limited. The dehydration should be carried out at a temperature which is sufficiently low to avoid degradation of the fluid. In the case of triaryl phosphate based fluids the dehydration will preferably be carried out at a temperature of less than 75° C. The dehydration step need not remove all the water although it is preferred that as much water as is reasonably practical is removed.

The dehydration step is preferably applied to the fluid shortly or immediately after it has been contacted with the ion-exchange resin. In this preferred embodiment the degradation of the fluid is minimised. The dehydration equipment is advantageously and conveniently situated on the by-pass loop, immediately downstream of the resin bed. The dehydration step is more effective when applied to the relatively small volume of fluid using this arrangement.

The use of an anionic exchange resin treatment in combination with a vacuum dehydration step has been discovered to reduce the acidity of the fluid and may also serve to increase its volume resistivity. The treatment process also tends to increase the clarity of the fluid and to reduce the concentration of metal ions in the fluid. The treatment may also serve to improve the water separability of the fluid.

The useful life of the fluid is prolonged as a result. In a preferred embodiment the fluid is subjected to a vacuum with a pull of from 650 to 950 mbar (110 to −200 mbar absolute pressure) and more preferably to a pull within the range 750 to 880 mbar (10 to −120 mbar absolute pressure).

The processes of this invention may usefully be employed to treat any of the major classes of functional fluid in particular fluids based upon triaryl phosphates, trialkyl phosphates, alkyl aryl phosphates, mineral oils, carboxylate esters and water/glycol fluids. The processes of this invention find particular application in the treatment of triaryl phosphate based fluids.

The triaryl phosphate may be derived from natural or synthetic phenols. Examples of phosphates derived from natural phenols include mesityl phosphate, tricresyl phosphate, trixylenyl phosphate and cresyl diphenyl phosphate. The synthetic phenols are most preferably those prepared by the reaction of phenol with an alkylating agent having three or four carbon atoms. The product of such a reaction may comprise a mixture of phenols and alkylated phenols. Triaryl phosphates produced by the phosphorylation of such a mixture may also be used in this invention.

The carboxylate esters which may usefully be treated according to this invention include the trimellitates, diesters eg., adipates, sebacates, and esters of trimethylolpropane and pentaerythritol. The processes of this invention are preferably used to maintain or return the properties of the fluid to the levels preferred by the user. In particular the water content of the body of the fluid will preferably be maintained or reduced to less than 0.1% w/w and more preferably less that 0.05% w/w. The neutralisation number of the fluid will preferably be less than 0.2 mgKOH/gm and more preferably less than 0.1 mgKOH/gm.

The applicants have also discovered that the processes of this invention offer an additional advantage in that the concentration of metal ions in the fluid, most notably, sodium, calcium, magnesium and aluminium can be controlled, or in the preferred embodiments reduced. The processes of this invention are preferably the sole process used to treat the fluid. They can, however, be used in combination with other known processes or with particular elements of those known processes. In particular, the fluid may also be contacted with a cationic ion exchange resin or with a filter comprising both an anionic and a cationic ion exchange resin. However, in general the use of a cationic resin will detract from the advantages of the processes of this invention and is thereby less preferred.

Functional fluids based on those various classes of compound will normally be formulated with minor proportions of other ingredients such as antifoaming agents and oxidation inhibitors.

The suitability of any particular anionic ion exchange resin for use in the processes of this invention may be determined by routine experiment. Those which are ineffective in reducing the level of acidity in the fluid are not useful. Likewise any resins which are not stable in the presence of the fluid are preferably not used. Examples of ion exchange resins which are useful in the processes of this invention include those sold under the Trade Marks AMBERLYST A-21, AMBERLYST IRA-68 and DOWEX 400 LB UG.

The physical form of resin may affect its performance in the processes of this invention. In particular we have discovered that uniformly sized resin particles (such as are sold as monospheres) may provide improved performance and their use forms a preferred aspect of this invention.

The invention is illustrated by the following examples:

SUMMARY OF METHODS USED

Method A (small scale test 50 mls)

The Test Fluid is passed through a vertical glass column, gravity fed, containing the specified solid treatment. The column and Test Fluid are heated to 60° C. by use of an infrared lamp. After several passes the "treated" fluid is analysed to determine any change in acidity.

NOTE: (Column contains a filter to remove particulates). (Treatment level=5% v/v solid to fluid).

Method B (up to 120 litres)

The Test Fluid, heated to 60° C. is pumped from a stainless steel reservoir, through two stainless steel housings which contain the cartridges holding the specified solid treatment, and back into the reservoir, thus creating a continuous circulatory system.

After completion of the test a sample of fluid is taken and analysed to determine any change in acidity and metal content.

NOTE: (Cartridge contains a filter to remove particulates). (Treatment level up to 4% w/w solid to fluid).

| METHOD (A) SOLID TREATMENT | FLUID TYPE | | |
|---|---|---|---|
| | PHOSPHATE ESTER | POLYOL ESTER | MINERAL OIL |
| Ion Exchange Resin Amberlyst A-21 (Anionic) | | | |
| Acidity MgKOH/g Before Treatment | 0.58 | 8.66 | 0.62 |
| Acidity mgKOH/g After Treatment | 0.00 | 5.67 | 0.00 |
| Ion Exchange Resin Dowex 400 LB UG (Anionic) | | | |
| Acidity MgKOH/g Before Treatment | 0.58 | 8.66 | 0.62 |
| Acidity MgKOH/g After Treatment | 0.01 | 5.27 | 0.11 |
| Ion Exchange Resin Amberlyst IRA-68 (Anionic) | | | |
| Acidity mgKOH/g Before Treatment | 0.58 | 8.66 | 0.62 |
| Acidity mgKOH/g After Treatment | 0.05 | 2.66 | 0.16 |

EFFECT OF SOLID TREATMENT ON ACIDITY AND METAL CONTENT IN PHOSPHATE ESTERS

| METHOD (B) | ACIDITY | METAL CONTENT PPM | | | |
|---|---|---|---|---|---|
| SOLID TREATMENT | mg/KOH/g | Na | AL | Mg | Ca |
| Ion Exchange Resin Amberlyst A-21 (Anionic) | | | | | |
| Before Treatment | 0.40 | 4 | 13 | 38 | 22 |
| After Treatment | 0.01 | 1 | 3 | 7 | 4 |
| Ion Exchange Resin Amberlyst A-21 (Anionic) | | | | | |
| Before Treatment | 0.29 | 3 | 10 | 30 | 22 |
| After Treatment | 0.08 | 3 | 5 | 5 | 5 |

EXAMPLE 2

Samples of a triaryl phosphate functional fluid sold under the Trade Mark Reolube Turbofluid (TF)46 by the FMC Corporation (UK) Ltd were tested using Method A described above. Four tests, A, B,.C and D were carried out using four samples of an anionic exchange resin sold under the Trade Mark Amberlyst A-21 having different water contents (the differences having been introduced by drying the resin). The samples were passed through the resin three times. The neutralisation number of the fluid was determined after each pass. The metal ion concentration in the fluid was determined after three passes. The results are presented in the following Table 3.

TABLE 3

| WATER CONTENT RESIN % W/W | 4.8 | | | | 10.2 | | | | 14.8 | | | | 43.0 | | | |
|---|---|---|---|---|---|---|---|---|---|---|---|---|---|---|---|---|
| TF46 STARTING VALUE NEUT No NNo MgKOH/g | 0.51 | | | | 0.51 | | | | 0.51 | | | | 0.51 | | | |
| RESULTS OF COLUMN TREATMENT | | | | | | | | | | | | | | | | |
| 1ST PASS NNo MgKOH/g | 0.17 | | | | 0.11 | | | | 0.08 | | | | 0.22 | | | |
| 2ND PASS NNo MgKOH/g | 0.15 | | | | 0.11 | | | | 0.11 | | | | 0.12 | | | |
| 3RD PASS NNo MgKOH/g | 0.14 | | | | 0.10 | | | | 0.10 | | | | 0.09 | | | |
| METALS ppm | Na | Ca | Al | Mg | Na | Ca | Al | Mg | Na | Ca | Al | Mg | Na | Ca | Al | Mg |
| TF46 STARTING VALUE | 3 | 22 | 14 | 31 | 3 | 22 | 14 | 31 | 3 | 22 | 14 | 31 | 3 | 22 | 14 | 31 |
| AFTER 3 PASSES | 2 | 16 | 10 | 25 | 2 | 12 | 9 | 18 | 2 | 9 | 8 | 15 | 2 | 12 | 8 | 17 |

EXAMPLE 3

The procedure of Example 2 was repeated using an ion exchange resin sold under the Trade Mark Dow M-43. The fluid utilised was Reolube TF46.

The results are presented in the following Table 4.

TABLE 4

| WATER CONTENT RESIN % W/W | 5.0 | 10.1 | 15.5 | 44.5 |
|---|---|---|---|---|
| TF46 STARTING VALUE NEUT No MgKOH/g | 0.51 | 0.51 | 0.51 | 0.51 |
| RESULTS OF COLUMN TREATMENT | | | | |
| 1ST PASS NEUT No MgKOH/g | 0.14 | 0.14 | 0.10 | 0.13 |
| 2ND PASS NEUT No MgKOH/g | 0.12 | 0.12 | 0.10 | 0.10 |
| 3RD PASS NEUT No MgKOH/g | 0.08 | 0.07 | 0.07 | 0.05 |

EXAMPLE 4

Method A was utilised to treat a mineral oil based functional fluid (VG46) and a polyol ester based fluid. The water content of the resins was measured and the results of these tests are summarised in Table 5.

TABLE 5

| | | | | | FRESH RESIN USED | |
|---|---|---|---|---|---|---|
| RESIN TYPE/FLUID TYPE | STARTING VALUE | 1ST PASS | 2ND PASS | 3RD PASS | 4TH PASS | 5TH PASS |
| AMBERLYST A-21 5% WATER /VG 46 MINERAL OIL | 0.62 | 0.37 | 0.34 | 0.29 | 0.10 | 0.10 |
| DOWEX 400 LB 5% WATER /VG 46 MINERAL OIL | 0.62 | 0.19 | 0.11 | 0.08 | 0.06 | 0.00 |
| PUROLITE CTA103 DR <3% WATER /VG 46 MINERAL OIL | 0.62 | 0.37 | 0.31 | 0.23 | 0.05 | 0.08 |
| AMBERLYST A-21 5% WATER /POLYOL ESTER | 8.66 | 6.97 | 7.42 | 7.07 | 5.57 | 4.93 |
| DOWEX 400 LB 5% WATER /POLYOL ESTER | 8.66 | 7.16 | 7.28 | 6.58 | 3.63 | 6.53 |
| PUROLITE CTA103 DR <3% WATER /POLYOL ESTER | 8.66 | 6.89 | 6.78 | 6.83 | 5.16 | 4.66 |

EXAMPLE 5

Method A was used to treat a phosphate ester based fluid using three different anionic ion-exchange resins. The results are shown in the following Table 6.

TABLE 6

| PROPERTY | FLUID AS RECEIVED (93 F 1) | AMBERLYST A 21 TREATED | | DOWEX MONO ANW 400 LB UG TREATMENT | |
|---|---|---|---|---|---|
| | | AFTER 18 PASSES | AFTER 108 PASSES | AFTER 58 PASSES | AFTER 90 PASSES |
| NEUTRALISATION NUMBER mg/KOH/g | 0.16 | 0.08 | 0.04 | 0.03 | 0.00 |
| METALS | | | | | |
| Na ppm | 5 | 1 | <1 | <1 | <1 |
| Al | <1 | <1 | 1 | 2 | <1 |
| Ca | 5 | 4 | 2 | 4 | 3 |
| Mg | 1 | 1 | 1 | <1 | <1 |
| Fe | 2 | 2 | 1 | <1 | <1 |
| Cu | 1 | 1 | 1 | <1 | <1 |

EXAMPLE 6

Method B was adapted by connecting a Pall HSP 181 Series Oil Purifier Vacuum Dehydration Pump to the stainless steel reservoir. The resin used in these tests was DOWEX MONO AMW 400 LB UG (wet 50% water). The test fluid was a triaryl-phosphate functional fluid sold under the Trademark Reolube Turbofluid (TF)46 by the FMC Corporation (UK) Limited.

The fluid was first treated by pumping it through the cartridges holding the ion-exchange resin. This treatment was continued until such time as the acidity of the resin was constant or nearly constant. Thereafter the fluid was pumped through the vacuum pump where it -was subjected to a pull of 850 mbars. This vacuum treatment was continued until the water content of the fluid was less than 0.02% by weight.

Analysis was carried out on:

1. Untreated fluid.
2. Vacuum dried, untreated fluid.
3. Resin treated to 1% v/v, 17 cycles (no vacuum drying).
4. Resin treated to 1% v/v and vacuum dried.
5. Continuation of 1% v/v resin treatment (No 4) after vacuum drying (24 further cycles).
6. Additional 1% v/v resin treatment (2% v/v total), (on No 5) (1.5 cycles).

The results are summarised in Table 7 and Table 8.

TABLE 7

| FLUID/TREATMENT | NEUT NO mgKOH/g | WATER % | VR OHM CM | METALS (PPM) | | | |
|---|---|---|---|---|---|---|---|
| | | | | Na | Mg | Ca | Al |
| UNTREATED | 0.44 | 0.10 | ×10¹⁰ 0.014 | 3 | 12 | 7 | 2 |
| PALL HSP 181 VACUUM PURIFIER 4 HRS ONLY | 0.41 | 0.02 | ×10¹⁰ 0.016 | 2 | 10 | 7 | 3 |
| RESIN (WET 1% V/V) ONLY (17 CYCLES) | 0.08 | 0.05 | ×10¹⁰ 0.039 | 2 | 7 | 4 | <2 |
| RESIN (WET 1% V/V) (17 CYCLES) + PALL VACUUM 4 HRS | 0.08 | 0.02 | ×10¹⁰ 0.32 | 2 | 8 | 4 | <2 |
| CONTINUED RESIN 1% V/V (TOTAL 41 CYCLES) | 0.07 | 0.02 | ×10¹⁰ 0.63 | — | — | — | — |
| CONTINUED + FRESH 1% V/V RESIN WET 2% V/V (TOTAL) FIRST FLUID (3 HRS) | 0.02 | 0.34 | ×10¹⁰ 0.61 | — | — | — | — |
| RESIN WET 2% V/V (TOTAL) (1.5 CYCLES) | 0.02 | 0.14 | ×10¹⁰ 0.93 | <1 | 6 | 3 | <1 |
| RESIN 1.5 CYCLES + PALL VACUUM 3 HRS | 0.02 | <0.02 | ×10¹⁰ 1.23 | — | — | — | — |

TABLE 8

| | UNTREATED | UNTREATED + VACUUM DRIED | RESIN TREATED 2% V/V FIRST FLUID | RESIN TREATED 2% V/V 1.5 CYCLES | RESIN TREATED 2% V/V 1.5 CYCLES VACUUM DRIED |
|---|---|---|---|---|---|
| WATER CONTENT | 0.10% | 0.02% | 0.34% | 0.14% | <0.02% |
| INITIAL ACIDITY mgKOH/g | 0.44 | 0.41 | 0.018 | 0.029 | 0.025 |
| ACIDITY AFTER: | | | | | |
| 65 HRS | 0.63 | 0.47 | 0.022 | −0.009 | −0.014 |
| 116 HRS | 0.85 | 0.55 | 0.041 | 0.020 | −0.013 |
| 164 HRS | 1.06 | 0.63 | 0.12 | 0.060 | 0.014 |
| COPPER WEIGHT LOSS AFTER 164 HOURS | | | | | |
| mg | −2.3 | −1.8 | −0.2 | −1.1 | −1.7 |
| mg cm$^2$ | −0.18 | −0.14 | −0.015 | −0.08 | −0.13 |

What is claimed is:

1. A process for the treatment of a non-aqueous functional fluid which consists essentially of contacting said fluid with an anionic ion-exchange resin in the presence of sufficient water that the acidity of the fluid may be reduced and subsequently removing water from the fluid by vacuum dehydration.

2. A process according to claim 1 wherein the water is removed from the fluid before any significant degradation of the fluid takes place.

3. A process according to claim 1 wherein water is removed from the fluid immediately after it has been in contact with the ion-exchange resin.

4. A process according to claim 1 wherein the treatment is applied to a portion of the total fluid mass, said portion subsequently being combined with the main body of the fluid.

5. A process according to claim 1 wherein the neutralisation number of the fluid after treatment is less than 0.2 mgKOH/gm.

6. A process according to claim 5 wherein the neutralisation number of the fluid after treatment is less than 0.1 mgKOH/gm.

7. A process according to claim 1 wherein the water content of the fluid after treatment is less than 0.1% w/w.

8. A process according to claim 7 wherein the water content of the fluid after treatment is less than 0.05% w/w.

9. A process according to claim 1 wherein the vacuum dehydration is carried out by applying a pull of from 650 to 950 mbar to the fluid.

10. A process according to claim 1 wherein the treatment is carried out at a temperature of less than 75° C.

11. A process according to claim 1 wherein the ion-exchange resin is not dried prior to being used.

12. A process according to claim 1 wherein the anionic ion-exchange resin is selected from those resins sold under the Trademarks Amberlyst A-21, Amberlyst IRA-68, Dow M43 and DOWEX 400LB.

13. A process according to claim 1 wherein the anionic ion-exchange resin comprises uniformly sized resin particles.

14. A process according to claim 1 wherein the treatment is used to maintain the nuetralisation number of the fluid at less than 0.2 mgKOH/gm and the water content of the fluid at less than 0.1% w/w.

15. A process according to claim 1 wherein the treatment process is used to reduce the acid value of the fluid to less than 0.2 mgKOH/gm and/or the water content of the fluid to less than 0.1% w/w.

16. A process according to claim 1 wherein the functional fluid is a triaryl phosphate, a trialkyl phosphate or an alkyl aryl phosphate based fluid.

17. A process according to claim 16 wherein the triaryl phosphate is selected from the grup consisting of mesityl phosphate, tricresyl phosphate, trixlyenyl phosphate, cresyl diphenyl phosphate and synthetic phosphates produced by phosphorylation of mixtures of phenols and alkylated phenols produced by the reaction of phenol with an alkylating agent comprising three or four carbon atoms.

18. A process according to claim 16 wherein the triaryl phosphate is a synthetic triaryl phosphate.

19. A process according to claim 1 wherein the functional fluid is a carboxylate ester based functional fluid.

20. A process according to claim 19 wherein the ester is a trimellitate, an adipate, a sebacate or an ester of trimethylolpropane or pentaerythritol.

21. A process according to claim 1 wherein the fluid is a mineral oil based fluid.

22. A process for the treatment of a non-aqueous function fluid selected from phosphate esters, mineral oils and carboxylate esters comprising the steps of (i) contacting a portion of the total fluid mass with an anionic ion-exchange resin in the presence of sufficient water that the acidity of the fluid may be reduced (ii) subsequently removing water from the fluid by vacuum dehydration and (iii) combining the treated fluid with the main body of the fluid; the process being carried out in situ in the apparatus in which the fluid is used.

23. A process according to claim 22, wherein the functional fluid is a triaryl phosphate, a trialkyl phosphate or an alkyl aryl phosphate based fluid.

24. A process according to claim 23, wherein the triaryl phosphate is selected from the group comprising mesityl phosphate, tricresyl phosphate, trixylenyl phosphate, cresyl diphenyl phosphate, or synthetic phosphates produced by the phosphorylation of mixtures of phenols and alkylated phenols produced by the reaction of phenol with an alkylating agent comprising three or four carbon atoms.

25. A process according to claim 23, wherein the triaryl phosphate is a synthetic triaryl phosphate.

26. A process according to claim 23, wherein the functional fluid is a carboxylate ester based functional fluid.

27. A process according to claim 26, wherein the ester is a trimellitate, an adipate, a sebacate or an ester of trimethylolpropanol or pentaerythritoal.

28. A process according to claim 22, wherein the fluid is a mineral oil based fluid.

29. A process for the treatment of a non-aqueous function fluid selected from phosphate esters, mineral oils and carboxylate esters consisting essentially of the steps of (i) contacting a portion of the total fluid mass with an anionic ion-exchange resin in the presence of sufficient water that the acidity of the fluid may be reduced (ii) subsequently removing water from the fluid by vacuum dehydration and (iii) combining the treated fluid with the main body of the fluid; the process being carried out in situ in the apparatus in which the fluid is used.

* * * * *